United States Patent [19]
Kothe et al.

[11] Patent Number: 5,987,910
[45] Date of Patent: Nov. 23, 1999

[54] LARGE-VOLUME INSULATED SHIPPING CONTAINER

[75] Inventors: Horst Kothe, Betheln; Wolfgang Graaff, Hildesheim, both of Germany

[73] Assignee: Waggonbau Elze GmbH & Co. Besitz KG, Elze, Germany

[21] Appl. No.: 08/982,657

[22] Filed: Dec. 2, 1997

[30] Foreign Application Priority Data

Dec. 2, 1996 [DE] Germany .......................... 196 49 871

[51] Int. Cl.⁶ .................................................. F25D 3/08
[52] U.S. Cl. ............................... 62/371; 62/407; 62/239; 220/1.5; 220/592.1; 220/592.09
[58] Field of Search ............................. 220/1.5, 592.1, 220/592.09; 62/371, 407, 239

[56] References Cited

U.S. PATENT DOCUMENTS

| | | | |
|---|---|---|---|
| 3,242,625 | 3/1966 | Tillinghast | 52/161 |
| 3,844,203 | 10/1974 | Takahashi | 98/33 |
| 4,502,293 | 3/1985 | Franklin, Jr. | 62/388 |
| 4,553,403 | 11/1985 | Taylor | 62/239 |
| 4,553,584 | 11/1985 | Bloomquist | 165/30 |
| 5,101,643 | 4/1992 | Hicke | 62/407 |
| 5,642,827 | 7/1997 | Madsen | 220/1.5 |

FOREIGN PATENT DOCUMENTS 44 33 728 A1  4/1995  Germany .

*Primary Examiner*—Henry Bennett
*Assistant Examiner*—M Shulman
*Attorney, Agent, or Firm*—Herbert Dubno; Andrew Wilford

[57] ABSTRACT

An insulated freight-transport container has a pair of longitudinally extending and parallel side walls, a top wall bridging the side walls, a front end wall bridging the side walls and connected to the top wall, and a rear end wall formed by a sill and a lintel attached to the top wall and defining a door opening therewith. A pair of doors are engageable with the opening to close same and a floor is formed of upper and lower skins and a body of insulation therebetween. The floor extends horizontally longitudinally from the door sill to the front end wall and bridges the two side walls. It is recessed below an upper edge of the door sill. A plurality of longitudinally extending rails fixed to the top door skin define a plurality of longitudinally extending air-conducting passage and have an upper surface level with the upper edge of the door sill.

17 Claims, 3 Drawing Sheets

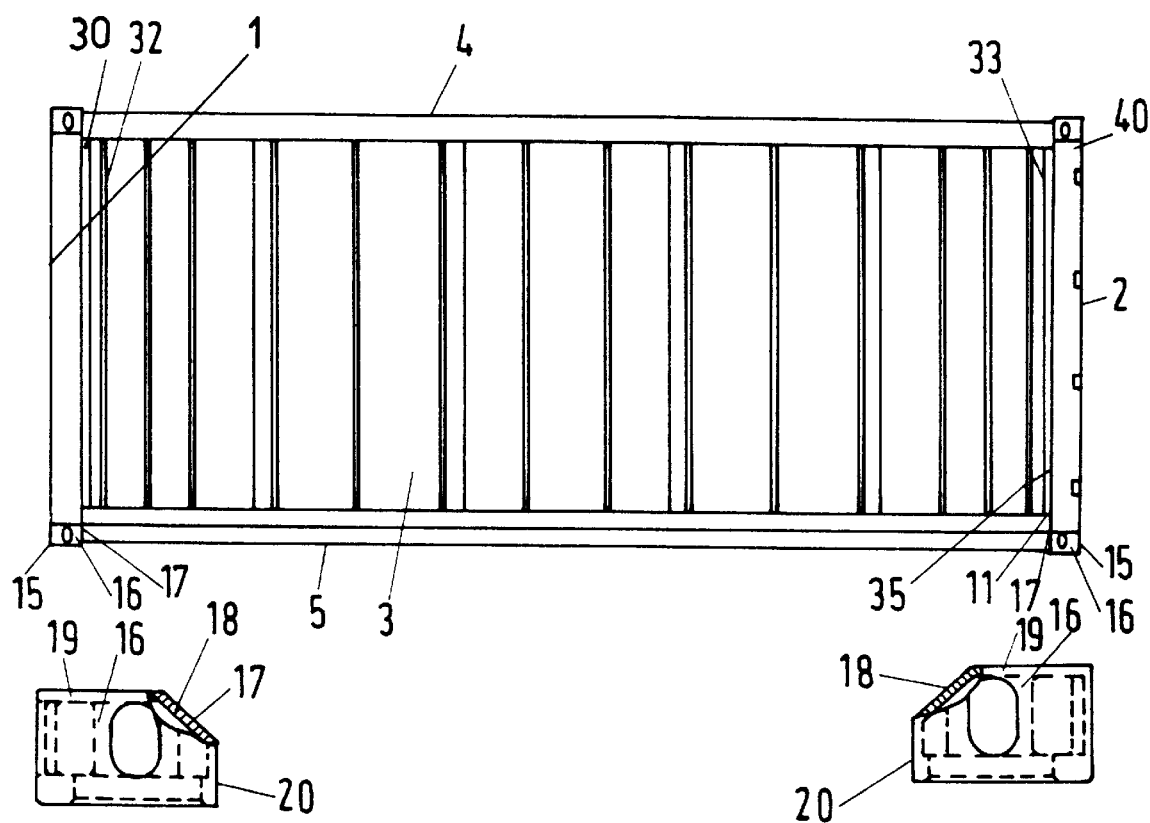

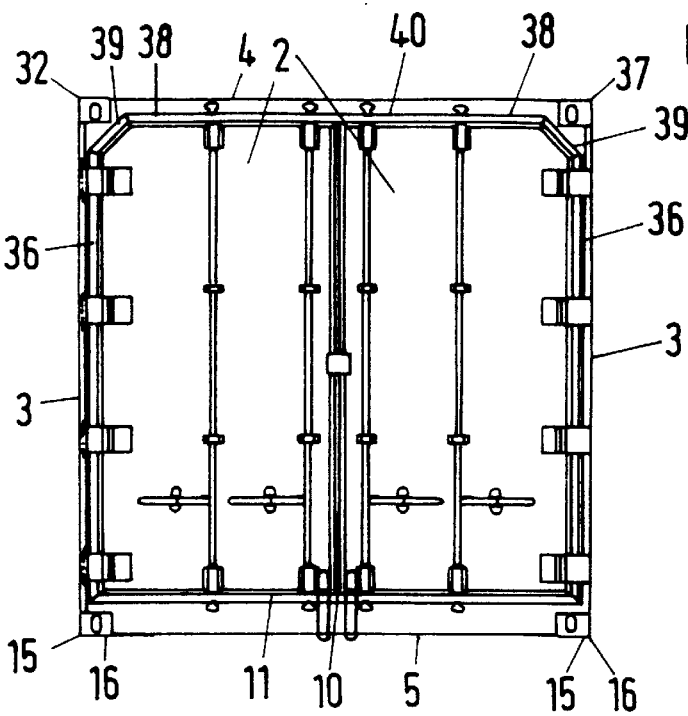
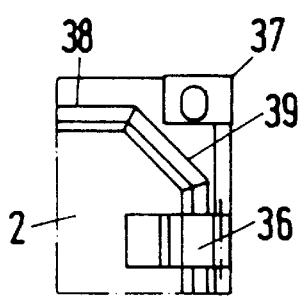
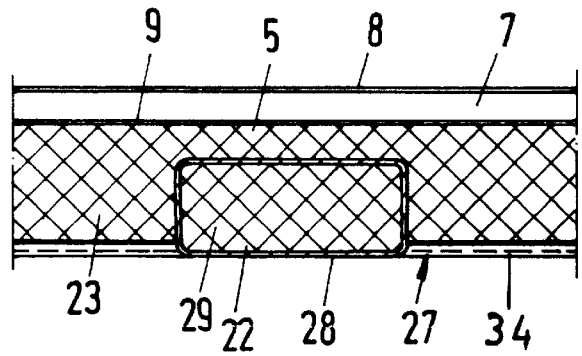
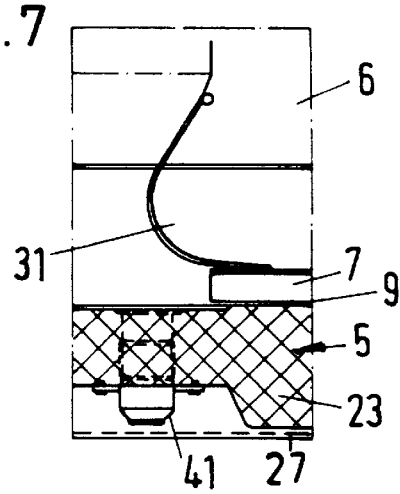
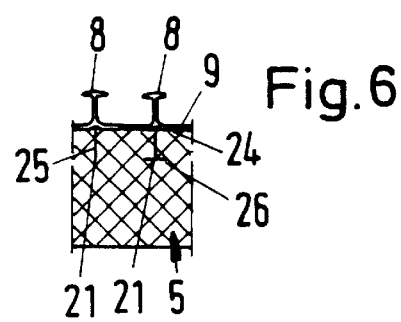

LARGE-VOLUME INSULATED SHIPPING CONTAINER

FIELD OF THE INVENTION

The present invention relates to a large-volume shipping container. More particularly this invention concerns such a container that is thermally insulated to protect its contents, e.g. produce, from temperature extremes.

BACKGROUND OF THE INVENTION

A standard transcontainer for shipping produce, frozen food, or the like is basically an elongated parallepipedal box having a closed front end wall, a rear wall formed by a pair of doors, side walls, a top wall, and a floor. Most of the walls are formed as two metal sheets or skins sandwiching a mass of closed-cell insulation. The top skin of the floor is provided with a plurality of longitudinally extending T-section rails that define longitudinal passages or slots. With containers of the so-called porthole type a cooler is hooked up to circulate cold air through the passages in the floor, thereby passing this chilled air around the freight inside the container.

The problem with this type of container is that it is difficult to load and unload. Getting a fork lift through the open doors and into the container is difficult, entailing climbing over the edge of the floor rails. The upper edge of the door opening is frequently down somewhat, so that getting the freight under this obstacle while still lifting it up for the floor is difficult, limiting the height of the freight that can be loaded.

OBJECTS OF THE INVENTION

It is therefore an object of the present invention to provide an improved thermally insulated large-volume freight container.

Another object is the provision of such an improved thermally insulated large-volume freight container which overcomes the above-given disadvantages, that is which is easy to load and unload, giving ample clearance, for instance, to a fork lift carrying a load of palletized freight.

SUMMARY OF THE INVENTION

An insulated freight-transport container has according to the invention a pair of longitudinally extending and parallel side walls, a top wall bridging the side walls, a front end wall bridging the side walls and connected to the top wall, and a rear end wall formed by a sill and a lintel attached to the top wall and defining a door opening therewith. A pair of doors are engageable with the opening to close same and a floor is formed of upper and lower skins and a body of insulation therebetween. The floor extends horizontally longitudinally from the door sill to the front end wall and bridges the two side walls. It is recessed below an upper edge of the door sill. A plurality of longitudinally extending rails fixed to the top door skin define a plurality of longitudinally extending air-conducting passage and have an upper surface level with the upper edge of the door sill.

Thus with this system a fork lift loaded with palletized freight can roll straight into the container. The floor surface defined by the upper flanges of the T-rails forming the air passages are level with the upper edge of the door sill.

According to the invention the upper surface of the rails is coplanar with the upper edge of the door sill. These rails are at most 30 mm high.

The floor in accordance with the invention has four corners and the container further has respective fittings in the corners having beveled sides fitting with the floor. The beveled sides extend at an angle of about 45° to top and end surfaces of the respective fittings. Thus they fit with the angled portion of the floor panel, since the floor itself is of uniform thickness between its skins so must drop down somewhat to accommodate the height of the passage-forming rails.

The floor is provided internally with stiffening beams and at least some of the rails are provided with stiffening ribs underneath the upper skin. The stiffening beams include transverse stiffening beams secured to the lower skin, normally four in number. At least some of the beams are filled with rigid insulating foam and the lower skin is formed with transverse stiffening grooves that are at least 5 mm deep.

In accordance with the invention a cooler on the front wall has a duct leading to front ends of the passages for feeding chilled air thereto. In addition the doors have inner faces formed with air-conducting grooves.

Hinges secure the doors on the rear end for pivoting between positions closing the door opening and positions generally flat against the side walls. Lifting fittings in upper corners of the front and rear walls are accommodated by beveled upper corners of the door.

BRIEF DESCRIPTION OF THE DRAWING

The above and other objects, features, and advantages will become more readily apparent from the following description, reference being made to the accompanying drawing in which:

FIG. 1 is a small-scale side view of a large-volume shipping container according to the invention;

FIGS. 2 and 3 are large-scale partly sectional views of corner fittings of the container;

FIG. 4 is a rear view of the door end of the container;

FIG. 5 is a longitudinal section through the floor of the container;

FIG. 6 is a cross section through the floor;

FIG. 7 is a longitudinal section through an end region of the container floor;

FIG. 8 is a larger-scale view of a detail from FIG. 4;

SPECIFIC DESCRIPTION

Figure 9:
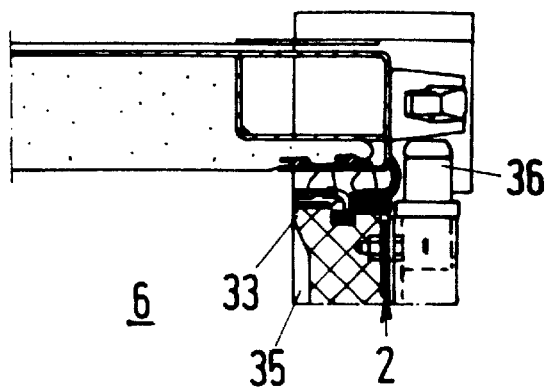
FIGS. 9 and 10 are vertical longitudinal sections through upper and lower door hinges.

As seen in FIG. 1 a container according to the invention has a vertical and transverse front wall 1, a parallel rear wall formed by a pair of generally identical doors 2, longitudinally extending and vertical side walls 3, a horizontal and longitudinally extending top wall 4, and a parallel floor 5 together defining a parallepipedal inside space 6. As shown in FIGS. 5 and 6, T-section rails 8 forming longitudinally extending vent passages 7 are secured to an upper surface or skin 9 of the floor 5. As clearly shown in FIG. 10, the upper floor skin 9 is below a plane P of a sill 11 defining a lower edge of an opening 10 for the doors 2. Upper flanges of the rails 8 lie on the plane P but the rails 9 stop short of the door opening 10 to form here a gap or inlet 14 that allows air circulation through the passages 7. These rails 8 are some 30 mm tall, as opposed to 40 mm in prior-art systems.

As shown in FIGS. 2 and 3 the container has in each of its lower four corners 15 a fitting 16 having a top side 19 secured to the bottom panel of the floor 5, a longitudinally inwardly directed end 20 extending perpendicular to the side 19 and a beveled planar corner 18 extending at 45° to both of them. The beveled corners 18 allow the floor 5 to be centrally recessed as described, fitting with the angled portion 12.

The floor 5 is basically comprised as shown in FIG. 5 of the upper skin 9 and a lower skin 27, both made of sheet metal, and an intervening mass 23 of rigid thermal insulation. Four transversely throughgoing box beams 22 filled with insulating foam 29 are imbedded in the floor 5. In addition the T-section beams 8 can be extended as shown in FIG. 6 into the foam mass 23 as upright rails 25 or T-section stiffening beams 26 secured to an underside 24 of the top sheet 9. Longitudinally extending ridges 34 some 5 mm high formed on the bottom skin 27 further stiffen the floor 5. The roof 4 is normally stiffened by an unillustrated inward groove.

Figure 10:
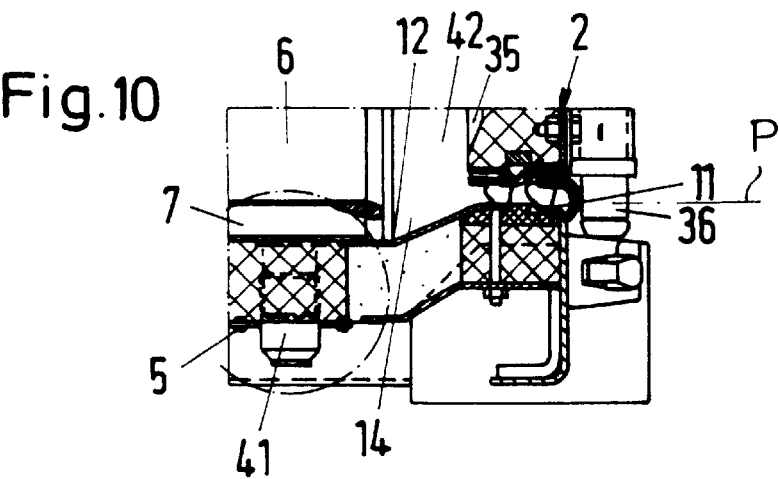
Figure 11:
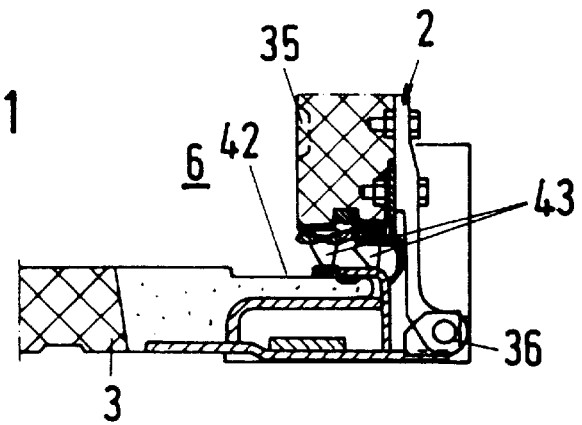
FIG. 11 is a horizontal section through a door hinge.

A refrigeration unit 30 no more than 336 mm thick is mounted on the front wall 1 of the container so as not to project past the outline of the container. It is connected as shown in FIG. 7 via a conduit 31 at a lower edge of the wall 1 with front ends of the passages 7 formed by the tracks 8. Vertical grooves 35 (see also FIG. 9) are formed on facing inner surfaces 32 and 33 of the end wall 1 and doors 2 to allow cool air to circulate in the space 6 around any freight therein. Each side wall 3 as shown in FIGS. 10 and 11 is formed at the rear end with a recess or setback 42 engaged by seals 43 at the respective edge of the respective door 2. These recesses 42 ensure that cooled air will circulate even at these critical corner regions. FIGS. 7 and 10 further show a drain fitting 41 of the type described in commonly owned copending application 08/982,665.

The doors 2 have external hinges 36 that allow them to be swung all the way flat against the outer faces of the sides 3 so that the container can be loaded and unloaded by a fork lift without damage to these doors 2. The hinges 36 have an offset of at most 55 mm to allow the doors some 270° of pivoting about the vertical axes defined by these hinges 36.

The doors 2 are formed as shown in FIGS. 4 and 8 with beveled-off corners 39 in the region of the standard top-corner pickup fittings 37 so that an upper edge 38 of the door opening 10 is a high as possible. This makes lifting freight and maneuvering it easier since the upper edge 38 is virtually level with a lower face of the roof 4.

I claim:

1. An insulated freight-transport container comprising:

a pair of longitudinally extending and parallel side walls;

a top wall bridging the side walls;

a front end wall bridging the side walls and connected to the top wall;

a rear end wall formed by a lower sill and an upper lintel attached to the top wall and defining a door opening therewith, and a pair of doors engageable with the opening to close same;

a floor formed of upper and lower skins and a body of insulation therebetween, the floor extending horizontally longitudinally from the door sill to the front end wall and bridging the two side walls, the upper floor skin being recessed below an upper edge of the door sill; and a plurality of longitudinally extending rails fixed to and projecting upward from the upper floor skin, defining a plurality of upwardly open and longitudinally extending air-conducting passages, and having generally coplanar upper surfaces level with the upper edge of the door sill.

2. The insulated freight-transport container defined in claim 1 wherein the upper surfaces of the rails are coplanar with the upper edge of the door sill.

3. The insulated freight-transport container defined in claim 2 wherein the rails are at most 30 mm high.

4. The insulated freight-transport container defined in claim 1 wherein the floor has four corners, the container further comprising respective fittings in the corners having beveled sides fitting with the floor.

5. The insulated freight-transport container defined in claim 4 wherein the beveled sides extend at an angle of about 45° to top and end surfaces of the respective fittings.

6. The insulated freight-transport container defined in claim 1 wherein the floor is provided internally with stiffening beams.

7. The insulated freight-transport container defined in claim 6 wherein at least some of the rails are provided with stiffening ribs underneath the upper skin.

8. The insulated freight-transport container defined in claim 6 wherein the stiffening beams include transverse stiffening beams secured to the lower skin.

9. The insulated freight-transport container defined in claim 8 wherein there are four such transverse stiffening beams.

10. The insulated freight-transport container defined in claim 6 wherein at least some of the beams are filled with rigid insulating foam.

11. The insulated freight-transport container defined in claim 1 wherein the lower skin is formed with transverse stiffening grooves.

12. The insulated freight-transport container defined in claim 11 wherein the grooves are at least 5 mm deep.

13. The insulated freight-transport container defined in claim 1, further comprising cooling means on the front wall including a duct leading to front ends of the passages for feeding chilled air thereto.

14. The insulated freight-transport container defined in claim 1 wherein the doors have inner faces formed with air-conducting grooves.

15. The insulated freight-transport container defined in claim 1, further comprising hinge means securing the doors on the rear end for pivoting between positions closing the door opening and positions generally flat against the side walls.

16. The insulated freight-transport container defined in claim 1, further comprising lifting fittings in upper corners of the front and rear walls, the doors having upper outer corners that are beveled to clear the respective fittings.

17. The insulated freight-transport container defined in claim 1, further comprising an automatic liquid drain extending through the floor.

* * * * *